United States Patent
Thiel et al.

(10) Patent No.: US 11,600,068 B2
(45) Date of Patent: Mar. 7, 2023

(54) SYSTEMS, METHODS, AND STORAGE MEDIA FOR PROCESSING DIGITAL VIDEO

(71) Applicant: Dilili Labs, Inc., Saratoga, CA (US)

(72) Inventors: Alexander Thiel, Santa Clara, CA (US); Tyler Compton, Sunnyvale, CA (US); Xintian Li, Saratoga, CA (US)

(73) Assignee: Dilili Labs, Inc., Saratoga, CA (US)

( * ) Notice: Subject to any disclaimer, the term of this patent is extended or adjusted under 35 U.S.C. 154(b) by 377 days.

(21) Appl. No.: 16/997,130

(22) Filed: Aug. 19, 2020

(65) Prior Publication Data
US 2021/0056314 A1    Feb. 25, 2021

Related U.S. Application Data

(60) Provisional application No. 62/889,148, filed on Aug. 20, 2019.

(51) Int. Cl.
*G06V 20/40* (2022.01)
*G06N 3/08* (2006.01)
*G06N 20/00* (2019.01)

(52) U.S. Cl.
CPC .............. *G06V 20/46* (2022.01); *G06N 3/08* (2013.01); *G06N 20/00* (2019.01); *G06V 20/41* (2022.01)

(58) Field of Classification Search
CPC ........ G06V 20/46; G06V 20/41; G06N 20/00; G04N 3/08
See application file for complete search history.

(56) References Cited

U.S. PATENT DOCUMENTS

| | | | | |
|---|---|---|---|---|
| 2002/0041339 | A1* | 4/2002 | Diepold | H04N 21/4318 348/700 |
| 2009/0265737 | A1* | 10/2009 | Issa | G11B 27/105 725/38 |
| 2014/0112527 | A1* | 4/2014 | Nister | G06V 20/635 382/176 |
| 2019/0087660 | A1* | 3/2019 | Hare | G06T 7/20 |
| 2019/0362157 | A1* | 11/2019 | Cambias | G06V 10/255 |
| 2020/0279386 | A1* | 9/2020 | da Veiga | G06T 7/55 |

* cited by examiner

*Primary Examiner* — David Bilodeau
(74) *Attorney, Agent, or Firm* — Neugeboren O'Dowd PC

(57) ABSTRACT

Systems, methods, and storage media for processing digital video are disclosed. Exemplary implementations may: receive digital video data at one or more digital video inputs; identify each of the plurality of video frames as one of a keyframe and an intermediate frame; use one or more first sets of software instructions to send at least one of the keyframes and the intermediate frames to one or more processing scripts; use the one or more processing scripts to implement an asynchronous batch processing system on at least one of the keyframes and the intermediate frames by applying one or more second sets of software instructions; and receive an output from the one or more second sets of software instructions.

20 Claims, 7 Drawing Sheets

| Capsule Name | Description | Requires Input | Outputs |
|---|---|---|---|
| Detector Person/Vehicles | Detects people/vehicles | None | Polygon location/object type |
| Detector Face | Detects face bounding boxes | None | Polygon locations of faces |
| Encoder Face | Support facial recognition | Polygon of a face | Face encoding |
| Encoder Person | Support person recognition | Polygon of a person | Person encoding |
| Tracker Person | Tracks people accurately | Person polygon and encoding | Track identifier (ID) |
| Classifier Gender | Gender for face detections | Polygon of a face | Gender classification |

FIG. 6

SYSTEMS, METHODS, AND STORAGE MEDIA FOR PROCESSING DIGITAL VIDEO

CROSS-REFERENCE TO RELATED APPLICATIONS

The present application for Patent claims priority to U.S. Provisional Application Ser. No. 62/889,148, entitled "Digital Video Processing System", filed Aug. 20, 2019, and the contents of which are incorporated herein by reference in their entirety.

FIELD OF THE DISCLOSURE

The present invention relates to digital video processing systems. In particular, but not intended to limit the invention, the present invention relates to digital video processing systems that may identify objects in a video and provide information related to those objects.

BACKGROUND

The availability and use of digital video has dramatically increased in recent years, and, as a result, there has been an increasing demand for the analyzing and providing of information related to the contents of such videos. However, current digital video processing systems are limited in their ability to smoothly integrate complex machine learning inference systems, such as neural networks, into their video analysis functionalities without producing significant processing and communication overheads.

SUMMARY

The present invention enables users to analyze digital video with machine learning systems, such as neural networks, while maintaining low processing and communication overheads. Such machine learning systems may be tuned or customized during runtime by a user, enabling the user to make real-time adjustments to the digital video analysis. The present invention may be used to identify objects in digital videos and provide information related to those objects, such as, but not limited to, the facial recognition of people. Additionally, the present invention may utilize asynchronous, batch processing and other processing methods to reduce processor load related to the digital video processing. By implementing the systems, methods, and apparatuses of the present invention, significant improvements in the capabilities of digital video analysis may be obtained. For the purposes of this disclosure, the terms "plugin", "capsule", "open vision capsule", and "vision capsule" may be used interchangeably throughout this application. Further, the terms "video stream", "video", "video frames" and "video input" may be used interchangeably throughout this application. Additionally, the terms "neural networks", "deep neural networks", and "artificial neural networks" may be used interchangeably throughout this application. While generally described in terms of real-time video analysis, aspects of this disclosure may be adapted for real-time image or picture analysis in other embodiments.

One aspect of the present disclosure relates to a system configured for processing digital video. The system may include one or more hardware processors configured by machine-readable instructions. The processor(s) may be configured to receive digital video data at one or more digital video inputs. The digital video data may include a plurality of video frames. The processor(s) may be configured to identify each of the plurality of video frames as one of a keyframe and an intermediate frame. The processor(s) may be configured to use one or more first sets of software instructions to send at least one of the keyframes and the intermediate frames to one or more processing scripts. The processor(s) may be configured to use the one or more processing scripts to implement an asynchronous batch processing system on at least one of the keyframes and the intermediate frames by applying one or more second sets of software instructions. In some embodiments, the processor(s) may be configured to receive an output from the one or more second sets of software instructions.

Another aspect of the present disclosure relates to a method for processing digital video. The method may include receiving digital video data at one or more digital video inputs. The digital video data may include a plurality of video frames. The method may include identifying each of the plurality of video frames as one of a keyframe and an intermediate frame. The method may include using one or more first sets of software instructions to send at least one of the keyframes and the intermediate frames to one or more processing scripts. The method may include using the one or more processing scripts to implement an asynchronous batch processing system on at least one of the keyframes and the intermediate frames by applying one or more second sets of software instructions. The method may include receiving output from the one or more second sets of software instructions.

Yet another aspect of the present disclosure relates to a non-transient computer-readable storage medium having instructions embodied thereon, the instructions being executable by one or more processors to perform a method for processing digital video. The method may include receiving digital video data at one or more digital video inputs. The digital video data may include a plurality of video frames. The method may include identifying each of the plurality of video frames as one of a keyframe and an intermediate frame. The method may include using one or more first sets of software instructions to send at least one of the keyframes and the intermediate frames to one or more processing scripts. The method may include using the one or more processing scripts to implement an asynchronous batch processing system on at least one of the keyframes and the intermediate frames by applying one or more second sets of software instructions. In some cases, the method may further include receiving an output from the one or more second sets of software instructions.

In some examples of the method, system, and non-transitory computer-readable storage medium described above, the digital video data comprises data received from at least one of digital video cameras, video files, and video streams. In some examples of the method, system, and non-transitory computer-readable storage medium described above, the at least one of the keyframes and the intermediate frames comprise the keyframes, where the keyframes are sent to the one or more processing scripts via a software data transfer component. In some examples of the method, system, and non-transitory computer-readable storage medium described above, each of the one or more second sets of software instructions comprise linear lists of software instructions which analyze one or more aspects of each of the keyframes. In some examples of the method, system, and non-transitory computer-readable storage medium described above, each of the one or more processing scripts comprises an oven.

In some examples of the method, system, and non-transitory computer-readable storage medium described above, implementing an asynchronous batch processing system by applying one or more second sets of software instructions comprises executing multiple sets of the linear lists of software instructions in-parallel via a plurality of ovens. In some examples of the method, system, and non-transitory computer-readable storage medium described above, the output from the one or more second sets of software instructions is received via the software data transfer component.

In some examples of the method, system, and non-transitory computer-readable storage medium described above, each of the linear lists of software instructions comprises a capsule and at least one of the capsules comprises a machine learning inference.

In some examples of the method, system, and non-transitory computer-readable storage medium described above, multiple machine learning inferences are executed in batches on one or more of the plurality of ovens. In some examples of the method, system, and non-transitory computer-readable storage medium described above, the multiple machine learning inferences comprise inferences received from multiple capsules. In some examples of the method, system, and non-transitory computer-readable storage medium described above, the software data transfer component comprises a video bus.

In some examples of the method, system, and non-transitory computer-readable storage medium described above, at least one of the multiple machine learning inferences comprises a neural network inference.

Some examples of the method, system, and non-transitory computer-readable storage medium described above may further include processes, features, means, or instructions for initializing a machine learning system onto one or more hardware components of a digital video processing system, wherein the machine learning system comprises a neural network. Some examples of the method, system, and non-transitory computer-readable storage medium described above may further include processes, features, means, or instructions for executing the machine learning inference. In some examples of the method, system, and non-transitory computer-readable storage medium described above, the neural network comprises a neural network for at least one of object recognition, object tracking, a bounding box identifying a location of an object, a person's age, a person's gender, and object trajectory. In some examples of the method, system, and non-transitory computer-readable storage medium described above, the output is at least partially based on information received from the neural network.

In some examples of the method, system, and non-transitory computer-readable storage medium described above, the oven comprises a backend. In some examples of the method, system, and non-transitory computer-readable storage medium described above, initializing a machine learning system onto one or more hardware components of a digital video processing system comprises spawning a plurality of backends on a plurality of Central Processing Units (CPUs) and Graphical Processing Units (GPUs). In some examples of the method, system, and non-transitory computer-readable storage medium described above, one or more of the capsules are processed sequentially. In some examples of the method, system, and non-transitory computer-readable storage medium described above, the output from at least one of the one or more capsules is utilized by least another one of the one or more capsules.

Some examples of the method, system, and non-transitory computer-readable storage medium described above may further include processes, features, means, or instructions for utilizing one or more third sets of software instructions to process any non-blocking portions within the one or more first sets of software instructions and/or utilizing an interface to adjust the output. In some examples of the method, system, and non-transitory computer-readable storage medium described above, each of the one or more first sets of software instructions comprises a recipe. Additionally or alternatively, in some examples of the method, system, and non-transitory computer-readable storage medium described above, at least a portion of the output is adjusted based on a confidence level, wherein the output is provided to at least one of the recipes.

In some examples of the method, system, and non-transitory computer-readable storage medium described above, each of the one or more third sets of software instructions comprises a RecipeRunner. In some examples of the method, system, and non-transitory computer-readable storage medium described above, the non-blocking portions of the one or more first sets of software instructions comprise portions where the processing will not stall an execution of the recipes.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 6 illustrates an exemplary list of capsules that may be used in a digital video processing system in accordance with embodiments described herein;

DETAILED DESCRIPTION

Figure 1:
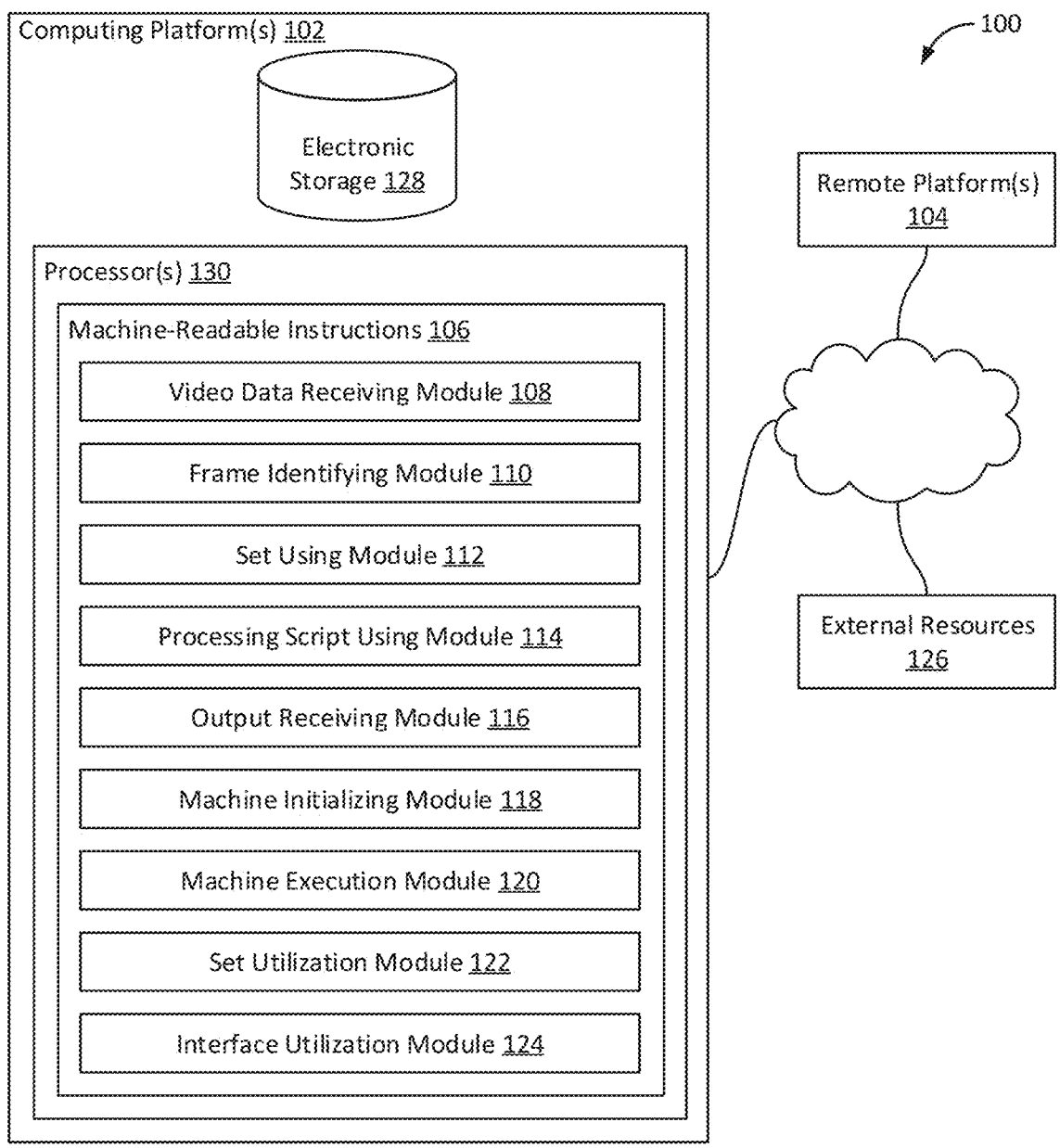
FIG. 1 illustrates a system configured for processing digital video, in accordance with one or more implementations.

The words "for example" is used herein to mean "serving as an example, instance, or illustration." Any embodiment described herein as "for example" or any related term is not necessarily to be construed as preferred or advantageous over other embodiments.

Embodiments of the present disclosure may comprise a digital video processing system that may be configured to accept digital video input from one or more video sources, such as digital video cameras, video files, or video streams. The digital video processing system may analyze the digital video input using the components and system designs disclosed herein. The digital video processing system may provide outputs related to the analysis of the digital video input, such as objects (e.g., people, animals, vehicles, etc.) identified in the digital video input and information related to those objects. In some embodiments, the digital video processing system may be additionally, or alternatively, configured to accept and analyze digital image input from one or more digital image sources and provide outputs related to the analysis of the digital image input. In some embodiments, the digital video processing system may be part of a BrainFrame Platform, on which the digital video processing system may be implemented alongside other systems or processing frameworks.

In some embodiments of the present disclosure, the digital video processing system may support a variety of operation modes. For instance, the digital video processing system may comprise a normal operation mode wherein individual video frames of the digital video input are identified as either a keyframe or an intermediate frame. In some examples, a keyframe may refer to a video frame identified from a plurality of similar video frames. In some embodiments, the video encoding format used by the video source, and provided to the digital video processing system may be used to identify the keyframes. Furthermore, these keyframes may be selected by the digital video processing system for analyzation. In some cases, intermediate frames may refer to the remaining unanalyzed frames between identified keyframes.

In some embodiments, the digital video processing system may also support a keyframe processing mode, where only keyframes may be selected for analysis during operation in said mode. In one such example, a tracking algorithm may be used to associate instances of the same object within multiple video frames. Furthermore, such a tracking algorithm may only be applied to identified keyframes, which may serve to optimize processing overhead associated with analyzing intermediate frames. During such operation, instances of abnormal operation may trigger an error correction processing mode. For example, if the tracking algorithm is unable to associate an instance of an object in a prior keyframe with an instance of the object in a current keyframe, the tracking algorithm may be retroactively applied to intermediate frames between the two keyframes to track the object. In some cases, retroactive application of the tracking algorithm to intermediate frames may enable the tracking algorithm to, for example, track objects moving at faster rates and/or track objects only visible for short periods of time (e.g., <1 second, <3 seconds, etc.). In some cases, other digital video analysis algorithms, besides the tracking algorithm, may also only process the keyframes identified for analysis during normal operation, without much more. In some aspects, only processing the identified keyframes for analysis during normal operation (i.e., refraining from processing other keyframes not identified for analysis) may serve to reduce processing overhead related to the decoding of encoded video frames and the subsequent analysis of those frames.

It is further contemplated that, yet another processing mode may be implemented to further optimize processing overhead. For example, a tracking algorithm may include a relaxed processing mode in which the processing and tracking related to a specific object may be paused, or alternatively, run at a reduced processing rate, until a period of time exceeding a predefined relax time threshold. In one such example, the predefined relax time threshold may comprise a user-specified time from 1 second to 10 seconds. During the predefined relax time, keyframe processing and tracking may be paused or run at a reduced processing rate for the object. This pausing or reduction in processing rate of specific processing functions may be applied to other video features beyond just object processing and may be applied to other digital video analysis algorithms beyond just tracking to enable for reduced processing overhead. In one embodiment, implementation and/or removal of the relaxed processing mode may be triggered by a predefined length of time, a predefined external condition being met, and/or a condition being met during the processing of a video frame or frame sequence. Some non-limiting examples of conditions may include a surge in video bandwidth use, which may be indicative of motion in the video, actual motion being detected in the video, an object with a certain attribute being detected (e.g., a person who is smoking, a person opening a door, etc.), an object in a certain location (e.g., a person crossing into a restricted zone), a face being detected that has not yet been recognized, etc.

Some embodiments of the present disclosure may comprise one or more capsules, also referred to as plugins. A capsule may comprise a software component configured to perform a function on a digital video input in order to extract and analyze information from the digital video. One example of extracting and analyzing information from the digital video may comprise identifying objects or actions in the video. In some examples, each capsule or plugin may be executed on the digital video processing system, where the digital video processing system may be part of a BrainFrame Platform. In some embodiments, a capsule may comprise a file (e.g., software file, code, etc.) stored within a filesystem, where the file may be loaded and unloaded during initialization (e.g., during startup) and/or removal (e.g., during shutdown) of the digital video processing system, respectively. Additionally, or alternatively, a capsule may be loaded and unloaded dynamically while the digital video processing system is running. If a capsule or plugin is loaded or unloaded during runtime, the processing of digital video or images may be paused until the loading or unloading of the Plugin is completed. In some embodiments, a capsule or plugin may, for example, comprise a file extension of ".bf", signifying that the capsule is associated with the BrainFrame Platform (i.e., the digital video processing system). In some embodiments, a capsule may include a Berkeley Software Distribution ("BSD") license or a Software Development Kit ("SDK") commercial license. In yet other cases, the capsule may be privately sourced. Plugins or capsules may also comprise one or more versions to support a variety of chipsets. In such cases, the capsules or plugins may be adapted to determine a chipset model during or upon capsule loading, which may allow an appropriate capsule version (i.e., compatible with the chipset model) to be loaded for processing.

In some embodiments of the present disclosure, the digital video processing system may implement linear lists of software instructions (also referred to as "recipes" for the purpose of this disclosure) during the analysis of digital video frames. Furthermore, an asynchronous processing framework, herein named MultiChef, may send the linear lists of software instructions or recipes to another processing script/framework (also referred to as an "oven" for the purpose of this disclosure), where the oven may asynchronously batch process the received software instructions and eventually return the result to the user, thus reducing the communication overhead between the CPU, GPU, and their respective memory. In some cases, throughput may be inversely related to the communication overhead. Further, throughput may be based on a variety of factors, such as a floating point precision level (e.g., Half-precision floating point format (FP16), single precision floating point format (FP32), double precision floating point format (FP64), etc.), a batch size (e.g. batch size 64, batch size 256, etc.), number of GPUs, and/or a number of CPU threads dedicated to input pipeline work (e.g., video input), to name a few non-limiting examples. In some cases, batch size may refer to the number of samples (e.g., video frames, images, etc.) that are passed to a GPU or CPU during the forward pass of computation. As an example, for an image data set, each image may be read into the CPU with its corresponding label information, resulting in 1 sample per image. More or less samples per image or video frame may be read in other cases, for instance, based on a desired accuracy level. Accordingly, in some examples, a higher batch size may correlate to a higher throughput due to the increased number of samples processed during each batch. It should be noted, however, that a larger batch size may require an increased number of iterations to reach the desired accuracy level. In such cases, the batch size may be selected such that the decreased time per batch (i.e., due to higher batch size) outweighs an increased number of batches required. In one example, a batch size of 256 may lead to a throughput that is at least 1.5× (i.e., 1.5 times higher) the throughput for a batch size of 64.

In some cases, recipes (i.e., linear list of software instructions) may be predefined, and dynamically instantiated. In other words, the order in which recipes are instantiated may be dynamic. For example, a frame may be processed using two loaded capsules, namely, a person detector and a person behavior classifier, further described in relation to FIG. 6. In this example, the recipe creation may comprise: (a) instantiating a recipe for person detector; and (b) instantiating multiple behavior classification recipes (i.e., one for each person that was previously detected). In some cases, the multiple behavior classification recipes may be instantiated once person detection results have been received. Alternatively, the multiple behavior classification recipes may be instantiated in parallel with the recipe for the person detector. In either case, the BrainFrame platform may support dynamic addition of recipes, based on needs or administrator (or user) defined settings, where recipes may be dynamically added once additional objects or "things" are discovered in a digital video frame.

Figure 3:
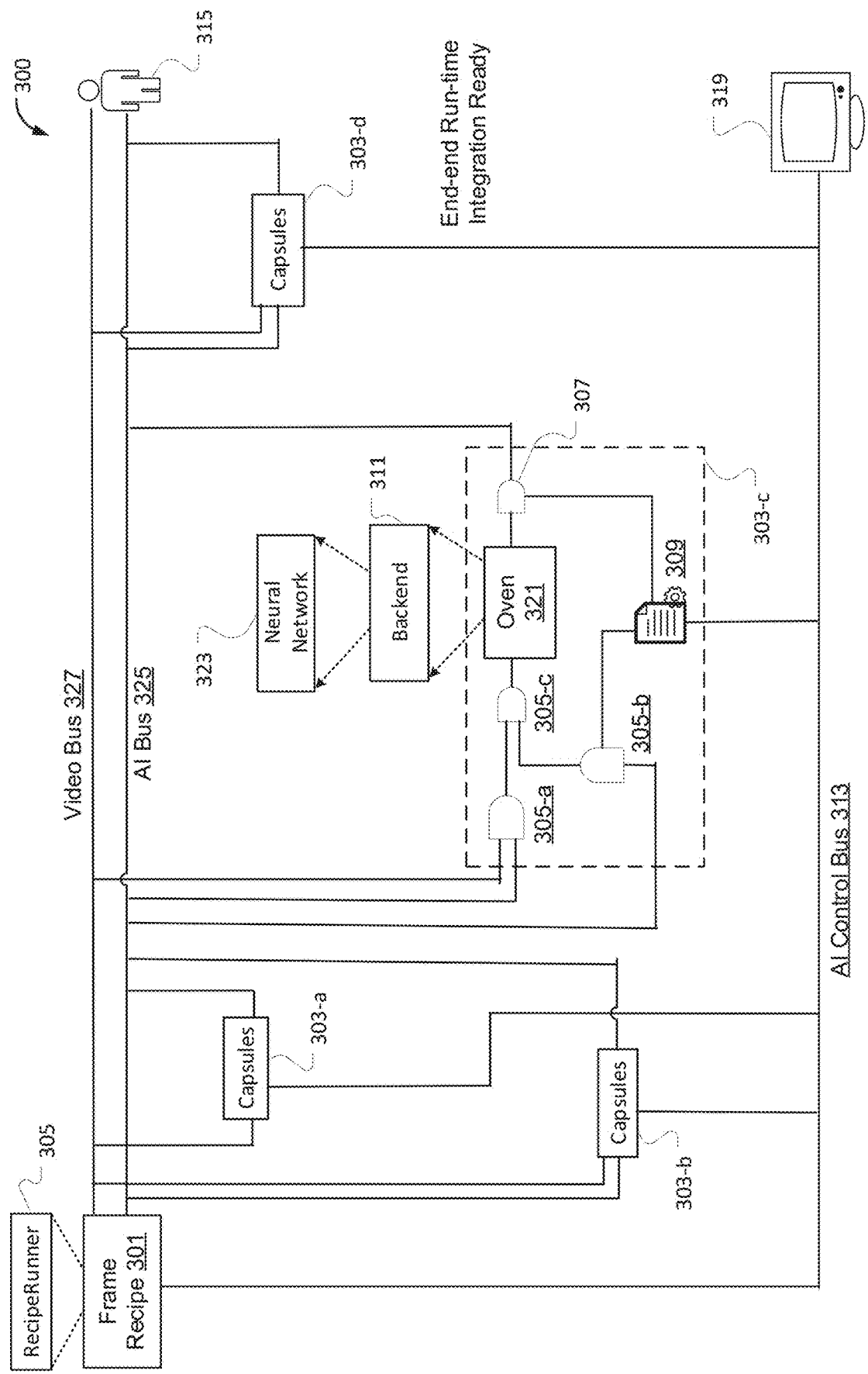
FIG. 3 illustrates an exemplary embodiment of a digital video processing system processing a single video frame in accordance with embodiments described herein.

In some embodiments, recipes may comprise "Frame Recipes" for analyzing one or more aspects of a single video frame, further described in relation to FIG. 3. In the processing of a Frame Recipe, a "Capsule Recipe" or a "Plugin Recipe" may be created for each capsule (or plugin) processing the digital video frame. In some cases, each of these different types of recipes may be sent to an oven, which may execute multiple recipes in parallel. In some other cases, the oven may be adapted to execute multiple recipes sequentially, for instance, based on a queue. Generally, each oven may receive (or take in) one or more digital video frames, digital image inputs, or a combination, and execute capsule recipes on the one or more digital video frames (or digital image inputs) using a "Backend" portion of the oven, as discussed in greater detail below in relation to at least FIGS. 3 and 4. In some cases, the "Backend" portion of the oven may simply be referred to as backend or oven backend.

In some embodiments, the oven may provide a daemon thread that receives image inputs from different "recipes". Further, these image inputs may be from a variety of un-associated sources, such as different video cameras, in any particular order (i.e., all image inputs from a first video camera may be received, following by the second camera, and so on, or alternatively, a portion of image inputs may be received from the first camera, based on timestamp information, followed by a portion from the second camera, based on timestamp information, followed by a different portion from the first camera, and so on). In some cases, the oven may be configured to collect a batch of these image inputs and input them into the algorithm at regular intervals (e.g., 1 microsecond, 10 microseconds, 20 microseconds, 1 millisecond, etc.). Alternatively, the oven may collect a batch of image input(s) as soon as they are available in the oven queue. As an example, if a single image has been received in the oven queue, the oven may immediately start running a first batch of size 1. Further, while that first batch is running, a plurality of images (e.g., 3 images) may also queue up (i.e., at the oven queue). In this case, once the oven finishes running inference on the single image in the first batch, the oven may proceed to run inference on the three images in the oven queue, where the batch size selected by the algorithm or the oven may be based on the number of images in the queue. In this example, the oven may run inference on the second batch comprising the three images with a batch size of 3, although a different batch size may be selected in different embodiments. Similar to the case when the first batch was running, a third set of images (e.g., 5 images) may be received at the oven queue while the second batch is running. Thus, the oven may be adapted to continuously receive a plurality of images at the oven queue and run inference on the images in the oven queue (i.e., after the oven has finished processing its current batch), where the batch size selected by the oven for running the inference may be based in part on the number of images in the oven queue. In some cases, the above process may stabilize over time such that the batch size converges (i.e., batch sizes become equal). In other words, the number of images in a current batch may equal the number of images that queue up while the current batch is being processed. Accordingly, since the batch size between different inferences stabilize to an equal batch size, and since the time required to process two batches of the same size is approximately the same, batches may also be input into the oven or the algorithm at approximately regular intervals. Said another way, consider an oven processing a current (or first) batch of batch size 'X' for a total of 'Y' milliseconds (i.e., where 'Y' milliseconds is the amount of time required by the oven to process all images in the current batch). Further, consider a second batch in the oven queue, also of batch size 'X'. In this case, once the oven has finished processing the current (or first) batch, the oven may process the second batch. The oven may also process the second batch in approximately 'Y' milliseconds. While the second batch is being processed, a third batch may queue up in the oven queue. If the third batch is also associated with a batch size 'X', the oven may also require 'Y' milliseconds to process the third batch. Thus, in this example, the oven may be configured to collect a batch of image inputs with a batch size 'X' and input the image inputs into the algorithm at a regular interval (e.g., every 'Y' milliseconds).

In some circumstances, the algorithm may be adapted to select a maximum batch size, which may alleviate the risk of running out of memory resources. Alternatively, the batch size may be based on user or administrator input received via an interactive user interface, further described in relation to FIG. 3. In some cases, the daemon thread provided by the oven may refer to a low priority thread that runs in the background and may be used to perform background supporting tasks. In some examples, a virtual machine, such as a Java Virtual Machine (JVM), may support the use of daemon threads for memory management, which may include garbage collection, releasing memory of unused objects, removing unwanted entries from the cache, etc. Additionally, daemon threads may not prevent the JVM from exiting, for instance, when all other user threads have finished execution. In other words, the JVM may be configured to terminate the daemon thread and shutdown once all user threads have been executed (i.e., since there are no other existing active threads for the daemon thread to provide service to when the daemon thread is the only remaining thread).

In some embodiments, a recipe may comprise a request for a machine learning inference, such as a neural network inference, related to the analysis of the digital video input. When such a request is encountered, the backend portion of an oven may initialize a machine learning system, such as a neural network, onto various hardware components within the digital video processing system and subsequently execute the machine learning inference requested by the recipe. In some cases, the recipe may comprise a frame recipe or a capsule recipe. In some embodiments, the machine learning system may be initialized onto at least one of the CPU and GPU memory of the digital video processing system.

Additionally, or alternatively, the machine learning system may be stored remotely on a network that is accessible by the digital video processing system, allowing the machine learning system to be loaded and unloaded to at least one of the CPU and GPU memory of the digital video processing system, as needed. In some embodiments, the machine learning inference requests from multiple recipes may be executed in batches on a single backend portion of an oven. It should be noted that the batch size for executing the multiple recipes may be adjusted or altered, for instance, via an algorithm. In such an example, digital video frame/image inputs from a plurality of sources, such as a plurality of video streams and/or similar digital video frames/images, may be analyzed in the same batch on a single backend. In some embodiments, a plurality of ovens may each contain a backend portion within the digital video processing system. Further, each backend portion may comprise a different machine learning system. For example, one backend may comprise a neural network for facial recognition, while another backend may comprise a neural network for object tracking. In some embodiments, the machine learning systems of the backend portions within the digital video processing system may be utilized to provide a number of different predictions relating to the digital video frame (or image input) being analyzed. For example, a machine learning system may provide predictions in the form of a bounding box identifying an object or person's location, a person's age, whether a person is male or female, or the trajectory of an object or person's movement.

FIG. 1 illustrates a system 100 configured for processing digital video, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. In some cases, users may access system 100 via client computing platform(s) 104. Further, system 100 may be an example of a digital video processing system, such as digital video processing system 300 described in relation to FIG. 3 and may implement one or more aspects of the figures described herein.

Server(s) 102 may be configured by machine-readable instructions 106. Further, machine-readable instructions 106 may include one or more instruction modules, wherein the instruction modules may include computer program modules. The instruction modules may include one or more of video data receiving module 108, frame identifying module 110, set using module 112, processing script using module 114, output receiving module 116, machine initializing module 118, machine execution module 120, set utilization module 122, interface utilization module 124, and/or other instruction modules.

Video data receiving module 108 may be configured to receive digital video data at one or more digital video inputs (e.g., Digital Visual Interface (DVI), DisplayPort, High-Definition Multimedia Interface (HDMI), CoaXPress, Serial Digital Interface (SDI), Mobile High-Definition Link (MHL), etc.). By way of non-limiting example, the digital video data may include data received from at least one of digital video cameras, video files, and/or video streams. In some examples, video streams may refer to continuously streaming multimedia including at least video data, and optionally audio data, received and presented to an end-user. Each of the linear lists of software instructions may include a capsule or plugin. Furthermore, at least one of the plugins or capsules may include a machine learning inference. In some cases, multiple machine learning inferences may be executed in batches on one or more of the plurality of ovens, where the machine learning inferences may be executed simultaneously (i.e., in parallel) or sequentially (i.e., one after another). In some embodiments, the multiple machine learning inferences may include inferences received from multiple plugins. Machine learning (ML) inference may refer to the process of running live data points into an algorithm, such as a ML algorithm (or ML model), to calculate an output such as a numerical score. In some aspects, ML inference entails deploying an application (e.g., software application) into a production environment, where the ML algorithm or model implements a mathematical algorithm. In some cases, that algorithm may be adapted to make calculations based on the characteristics of the data, for instance, digital visual data. In the ML lifecycle, ML inference is preceded by the training phase, which is also the first phase. In some cases, an ML model may first be created or trained by running specified subset(s) of data into the model. In the second phase (i.e., inference), the ML model is put into action on live data, such as digital video data received from one or more video cameras, to produce actionable outputs.

The software data transfer component may include a video bus, also shown as video bus 327 in FIG. 3. At least one of the multiple machine learning inferences may include a neural network inference. Neural networks may refer to sets of algorithms designed to replicate or model the human brain. In some cases, neural networks may be utilized to recognize patterns by interpreting sensory data through machine perception, labeling, or clustering raw input data (e.g., numerical data). In some examples, neural networks may be trained by processing examples, each of which contains a known input and a result. Further, neural networks may be adapted to form probability-weighted associations from the processing examples and store the known inputs and results within the data structure of the neural network's net. For instance, the training of the neural network may comprise determining the difference (e.g., an error, such as a numerical error) between the processed output of the network (e.g., output calculated by the neural network from the known input), which may be a prediction, and the target output (i.e., known result). The neural network may then adjust its weighted associations according to a learning rule and the error value. Accordingly, neural networks may be adapted to continuously evolve and reduce the error in future iterations as more and more processing or training examples are provided to the network.

In some embodiments, the oven may include a backend. Furthermore, initializing a machine learning system onto one or more hardware components of a digital video processing system may include spawning a plurality of backends on a plurality of CPUs and/or GPUs. In some examples, one or more of the plugins or capsules may be processed sequentially. Further, the digital video data may include a plurality of video frames (i.e., snippets of video of a duration less than or equal to a threshold, where the threshold may be 1 second, 10 milliseconds (ms), 5 ms, etc.).

Frame identifying module 110 may be configured to identify each of the plurality of video frames as one of a keyframe and an intermediate frame. In some examples, a keyframe (or key frame) may be a location on a timeline marking the beginning or end of a transition. A key frame may hold special information defining where a transition stops or starts. Furthermore, an intermediate frame may refer to a video frame that is interpolated over time between the transition definitions of a keyframe. In some regards, the illusion of motion may be created by interpolation of the intermediate frames. In some other cases, a key frame, also referred to as an intra-frame, may be a frame in which a complete image in stored in the data stream. In other words, a key frame may refer to a video frame identified from a plurality of similar video frames. In such cases, the data stream may only store changes that occur from one from to the next, which may serve to minimize the amount of information that must be stored. In some embodiments, keyframes may be included at arbitrary intervals while encoding video. Additionally or alternatively, intermediate frames may refer to the remaining unanalyzed frames between identified keyframes.

Set using module 112 may be configured to use one or more first sets of software instructions to send at least one of the keyframes and the intermediate frames to one or more processing scripts. Each of the one or more processing scripts may include an oven, previously described above. Additionally or alternatively, each of the one or more first sets of software instructions may include a recipe (e.g., linear list of software instructions).

Processing script using module 114 may be configured to use the one or more processing scripts to implement an asynchronous batch processing system on at least one of the keyframes and the intermediate frames by applying one or more second sets of software instructions. The at least one of the keyframes and the intermediate frames may include the keyframes, where the keyframes are sent to the one or more processing scripts via a software data transfer component. Each of the one or more second sets of software instructions may include linear lists of software instructions for analyzing one or more aspects of each of the keyframes.

Output receiving module 116 may be configured to receive output from the one or more second sets of software instructions. The output from the one or more second sets of software instructions may be received via the software data transfer component. In some embodiments, the output from at least one of the one or more capsules or plugins may be utilized by least another one of the one or more capsules or plugins. In some cases, at least a portion of the output may be adjusted based on a confidence level, further described in relation to FIGS. 3, 4, and 7. Furthermore, the output may be provided to at least one of the recipes.

Machine initializing module 118 may be configured to initialize a machine learning system onto one or more hardware components of a digital video processing system, such as digital video processing system 300 in FIG. 3. The non-blocking portions of the one or more first sets of software instructions may include portions that when processed (i.e., executed or run) may not cause an execution of the recipes to stall or pause. In other words, the non-blocking portions may be adapted such that they do not block the execution of the recipes or linear list of software instructions. In some embodiments, the machine learning system may also include a neural network. By way of non-limiting example, the neural network may include a neural network for at least one of object recognition, object tracking, a bounding box identifying a location of an object, a person's age, a person's gender, and object trajectory. In some examples, the output may be at least partially based on information received from the neural network.

Machine execution module 120 may be configured to execute the machine learning inference.

Set utilization module 122 may be configured to utilize one or more third sets of software instructions to process any non-blocking portions within the one or more first sets of software instructions. In some embodiments, each of the one or more third sets of software instructions may include a RecipeRunner, also referred to as a Recipe Runner. In some embodiments, the RecipeRunner may be implemented via an event loop for running recipe steps. An event loop may refer to a programming construct or software design pattern that waits for and dispatches events or messages in a program. In some cases, an event loop, such as the RecipeRunner, may be adapted to transmit requests to an internal or external event provider, where the event provider blocks the request until an event has arrived. Following request transmittal, the event loop may call a relevant event handler that dispatches the event. In some embodiments, the event loop may also be referred to as a message dispatcher, message loop, message pump, or a run loop. Further, the event loop (e.g., RecipeRunner) may be adapted to operate asynchronously with the message originator (e.g., set utilization module utilizing third sets of software instructions). In some embodiments, the event loop or RecipeRunner may allow non-blocking input/output (I/O) operations to be performed, for instance, by offloading operations to the system kernel whenever possible. In some cases, an event loop may be executed on callbacks in a phase's queue, where the event loop moves between different phases and performs operations specific to that phase. In some cases, each phase may comprise a queue (e.g., first in first out (FIFO) queue) of callbacks to be executed. Further, when the event loop, such as the RecipeRunner, enters a given phase, the event loop performs operations specific to that phase, which may include executing callbacks in that phase's queue until the queue has been exhausted or the maximum number of callbacks has been executed. After a queue has been exhausted or callback limit has been reached, the event loop proceeds to perform operations on the next phase, and so on.

Interface utilization module 124 may be configured to utilize an interface to adjust the output. In some embodiments, the interface may be an interactive user interface, which may be similar or substantially similar to the interface 319 in FIG. 3. For instance, the interface may be associated with the options system for updating capsule parameters during run time, as further described in relation to FIG. 3.

In some implementations, implementing an asynchronous batch processing system, for instance, by applying one or more second sets of software instructions, may include executing multiple sets of the linear lists of software instructions in-parallel via a plurality of ovens. In some cases, the multiple sets of the linear lists of software instructions may be executed sequentially. In yet other cases, a portion of the multiple sets of the linear lists of software instructions may be run in-parallel, and the remainder sequentially.

In some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute modules 108, 110, 112, 114, 116, 118, 120, 122, and/or 124, and/or other modules. Processor(s) 130 may be configured to execute modules 108, 110, 112, 114, 116, 118, 120, 122, and/or 124, and/or other modules by software; hardware; firmware; some combination of software, hardware, and/or firmware; and/or other mechanisms for configuring processing capabilities on processor(s) 130. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, and/or 124 are illustrated in FIG. 1 as being implemented within a single processing unit, in implementations in which processor(s) 130 includes multiple processing units, one or more of modules 108, 110, 112, 114, 116, 118, 120, 122, and/or 124 may be implemented remotely from the other modules. The description of the functionality provided by the different modules 108, 110, 112, 114, 116, 118, 120, 122, and/or 124 described below is for illustrative purposes, and is not intended to be limiting, as any of modules 108, 110, 112, 114, 116, 118, 120, 122, and/or 124 may provide more or less functionality than is described. For example, one or more of modules 108, 110, 112, 114, 116, 118, 120, 122, and/or 124 may be eliminated, and some or all of its functionality may be provided by other ones of modules 108, 110, 112, 114, 116, 118, 120, 122, and/or 124. As another example, processor(s) 130 may be configured to execute one or more additional modules that may perform some or all of the functionality attributed below to one of modules 108, 110, 112, 114, 116, 118, 120, 122, and/or 124.

Figure 2:
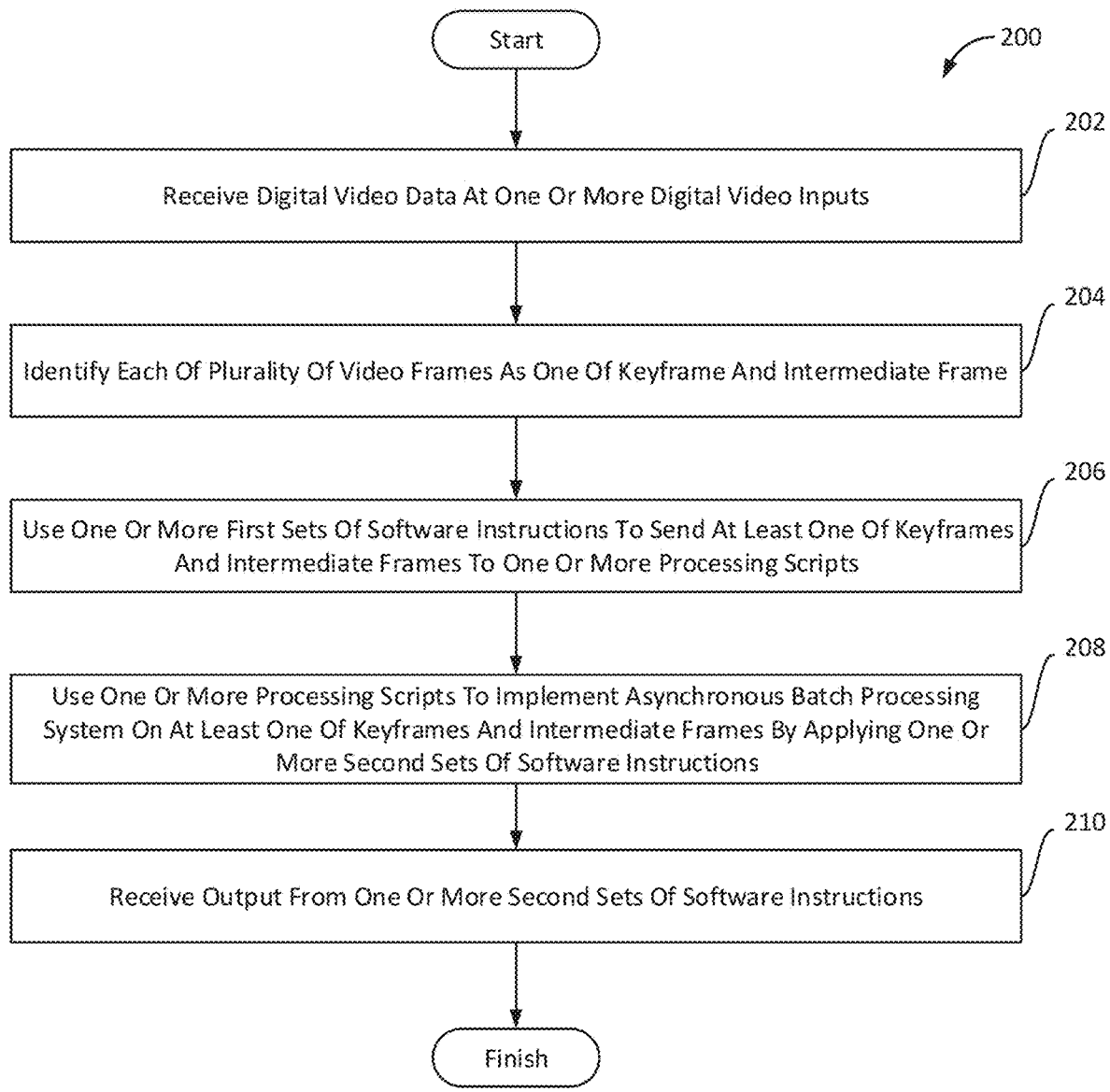
FIG. 2 illustrates a method for processing digital video, in accordance with one or more implementations.

FIG. 2 illustrates a method 200 for processing digital video, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting. In some cases, method 200 may implement one or more aspects of FIG. 1, and other figures described herein.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

As illustrated, an operation 202 may include receiving digital video data at one or more digital video inputs. The digital video data may include a plurality of video frames. Operation 202 may be performed by one or more hardware processors configured by machine-readable instructions including a module that is the same as or similar to video data receiving module 108, in accordance with one or more implementations.

An operation 204 may include identifying each of the plurality of video frames as one of a keyframe and an intermediate frame. Operation 204 may be performed by one or more hardware processors configured by machine-readable instructions including a module that is the same as or similar to frame identifying module 110, in accordance with one or more implementations.

An operation 206 may include using one or more first sets of software instructions to send at least one of the keyframes and the intermediate frames to one or more processing scripts. Operation 206 may be performed by one or more hardware processors configured by machine-readable instructions including a module that is the same as or similar to set using module 112, in accordance with one or more implementations.

An operation 208 may include using the one or more processing scripts to implement an asynchronous batch processing system on at least one of the keyframes and the intermediate frames by applying one or more second sets of software instructions. Operation 208 may be performed by one or more hardware processors configured by machine-readable instructions including a module that is the same as or similar to processing script using module 114, in accordance with one or more implementations.

An operation 210 may include receiving output from the one or more second sets of software instructions. Operation 210 may be performed by one or more hardware processors configured by machine-readable instructions including a module that is the same as or similar to output receiving module 116, in accordance with one or more implementations.

FIG. 3 illustrates an exemplary embodiment of a digital video processing system 300 as described herein processing a single video frame. In some cases, the digital video processing system 300 may implement one or more aspects of the system 100 described in relation to FIG. 1, and other figures described herein. As illustrated, digital video processing system 300 may be utilized by a user 315 for analyzing information within a video stream. In some cases, a video stream may comprise one or more video frames of people and/or objects (e.g., vehicles, furniture, animals, etc.). Additionally, as shown, video processing system 300 may comprise one or more capsules 303 (e.g., capsules 303-a, 303-b, 303-c, etc.), also referred to as plugins, a control interface 319, an oven 321, a backend 311, a neural network system 323, preprocessing units 305 (e.g., preprocessing units 305-a, 305-b, 305-c), a video bus 327, an artificial intelligence (AI) bus 325, and/or an AI control bus 313. In some cases, at least one capsule 303 (e.g., capsule 303-c) may comprise settings/control 309, which may be configured to be altered by the user 315. In some cases, the user 315 may alter the settings/control 309 during runtime using the control interface 319, where the control interface 319 may share any alterations via the AI control bus 313. In some cases, the control interface 319 may be an interactive user interface presented via a visual display on a computer, a laptop, a NetBook, a smartphone, or a tablet, to name a few non-limiting examples. In some cases, the interactive user interface or control interface may be configured to be utilized with a variety of operating systems. Further, the control interface 319 may be used in conjunction with a user input device (not shown), such as a keyboard, a mouse, a microphone (e.g., if voice recognition is enabled), a joystick, etc.

In some examples, video processing system 300 may comprise a frame recipe 301, which may be used to initiate the processing and analysis of a frame. In some cases, the frame recipe 305 may be used in conjunction with a RecipeRunner 305. The RecipeRunner 305 may receive and execute non-blocking portions of the frame recipe 301, for instance, portions of the frame recipe 301 that may not cause the execution to stall (or pause). The RecipeRunner may be embodied using hardware, software, or a combination thereof. In some cases, capsules 303 may be loaded with capsule code, where the capsule code may be separated such that there is at least one of a blocking portion and a non-blocking portion. It should be noted that more than one blocking portion and/or non-blocking portion (e.g., per capsule, or per video processing system) may be utilized in some embodiments. Further, the recipes (e.g., capsule recipe, frame recipe, etc.) may be designed or adapted to only run non-blocking portion(s) of the capsule code. In such cases, any blocking portion(s) of the capsule code may be sent to the oven 321 so that they can be processed in another thread.

In some cases, the frame recipe 301 may share the frame, via the video bus 327, with one or more of the capsules 303 analyzing the frame and/or the user 315. In some embodiments, sharing the frame, via the video bus 327, may be based on executing a set of software instructions. The frame recipe 301 may also share AI information, or machine learning system information, with each of the capsules 303 and the user 315 via the AI bus 325. Additionally, AI information may be shared amongst various capsules 303 during analysis of the frame. For example, the AI information output from one capsule (e.g., capsule 303-a) may be input into another capsule (e.g., capsule 303-b). In some embodiments, the capsules 303 may execute a capsule recipe (or a plugin recipe). In such cases, the capsules 303 may utilize the backend 311 portion of the oven 321 to provide predictions during frame analysis. As illustrated, in some cases, the backend 311 portion of the oven 321 may also implement a neural network system 323 for providing said predictions.

After the capsules 303 have performed their respective analysis of the frame, for instance, after executing a capsule (or plugin) recipe, AI information pertaining to the analysis results, such as the previously mentioned machine learning system predictions, may be sent to the user 315 via AI bus 325. As previously described, in some cases, the settings and control (e.g., settings/control 309 of capsule 303-c) of each of the capsules 303 may be altered by the user 315 during runtime using the control interface (e.g., control interface 319), where the control interface shares any alterations via the AI control bus 313. For example, a capsule 303 may comprise one or more options, where an option may comprise a portion of a plugin or capsule that affects how the capsule processes received information. In one example of modifying a capsule 303 via the control interface 319, a capsule 303 (e.g., capsule 303-c) may enable option modification by receiving user commands from the interface 319. These user commands may be used to modify the settings/control 309, which in turn dictates how the data received by the capsule 303-c is processed. One option that may be modified for settings/control 309 in a manner described above may comprise a plugin (or capsule) feature for filtering plugin (or capsule) output. For example, the user 315 may modify the capsule 303 in order to allow the capsule 303 output to identify certain types of objects in a video stream. It is contemplated that in such an embodiment, the user 315 may receive notifications of identified persons in the video stream, identified vehicles or other objects in the video stream, or a combination. Additionally or alternatively, other types of object detection (e.g., identify dogs or horses) or action detection (e.g., identify when a person opens a door, or a person raises their hand) are also contemplated in different embodiments.

Other options available for user modification may comprise a confidence level associated with a plugin or capsule output. For example, the video processing system 300 may allow the user 315 to set a threshold (e.g., 85%, 90%, 95%, etc.) for a plugin (or capsule) confidence level. In such cases, the capsule 303 (or plugin) may only output data when the capsule (or plugin) has determined that the video data (e.g., a video object) comprises (e.g., matches) the desired output (e.g., a predefined object) with a confidence level at or above the threshold. This confidence level may be associated with a similarity of identified video object vectors to vectors associated with the predefined object (e.g., aggregated video object vector data is within a 90% similarity to the desired vector data). It should be noted that, capsule or plugin modification is not limited to the above examples, since capsule or plugin options may be used to configure any other aspect of capsules 303.

It is contemplated that the user 315 may tune or customize the neural network systems, such as neural network system 323, within the capsules 303 (e.g., capsule 303-c) in real time, which may facilitate rapid optimization of the neural network system(s). In some circumstances, current techniques for digital video processing may suffer some drawbacks, one of them being needing to restart the application after tuning a parameter. In some circumstances, the code may also need to be recompiled after tuning the parameter. According to aspects of the present disclosure, the BrainFrame platform may support real-time updating of parameters for an algorithm or a video scene, without needing to rebuild or restart the application each time a parameter is changed. For instance, after starting the server and the client (e.g., laptop, smartphone, tablet, etc.) at runtime, a user may load their capsule and optionally change "capsule options". After observing changes (e.g., objects or persons being identified) occurring in real time (e.g., via the user interface of the digital video processing system), the user or administrator may decide to tune a parameter. In such cases, after changing the parameter, the user may view results associated with the new value for the parameter almost instantaneously (i.e., with a latency less than a threshold, such as 1 second, 5 seconds, etc.). In some aspects, the BrainFrame platform may allow for more rapid iterations due to the minimal latency associated with tuning or updating parameters, since the application may not need to be restarted or rebuild upon changing a parameter.

In some embodiments, the capsules 303 may preprocess the frame with one or more preprocessing units 305 (e.g., preprocessing units 305-a, 305-b, 305-c, etc.) before sending the frame to the backend 311 for analysis. In some cases, frame analysis may be used to match the image syntax expected by the neural network system 323. The capsules 303 may also postprocess the predictions provided by the neural network system 323 via one or more postprocessing units (e.g., post processing unit 307 in capsule 303-c). Post processing may be deployed to discard predictions falling below a certain confidence value (e.g., <90%) or discard predictions lying outside of a certain region of the frame, to name a few non-exhaustive examples. In some embodiments, each of the inputs and outputs to the capsules 303 may have public and private sections. In one such example, public AI information outputs provided to the AI bus 325 may be shared outside of the digital video processing system 300, which may enable interoperability with other systems and devices. Contrastingly, private AI information outputs may be retained within a closed system, which may serve to provide security benefits against rogue parties.

Figure 4:
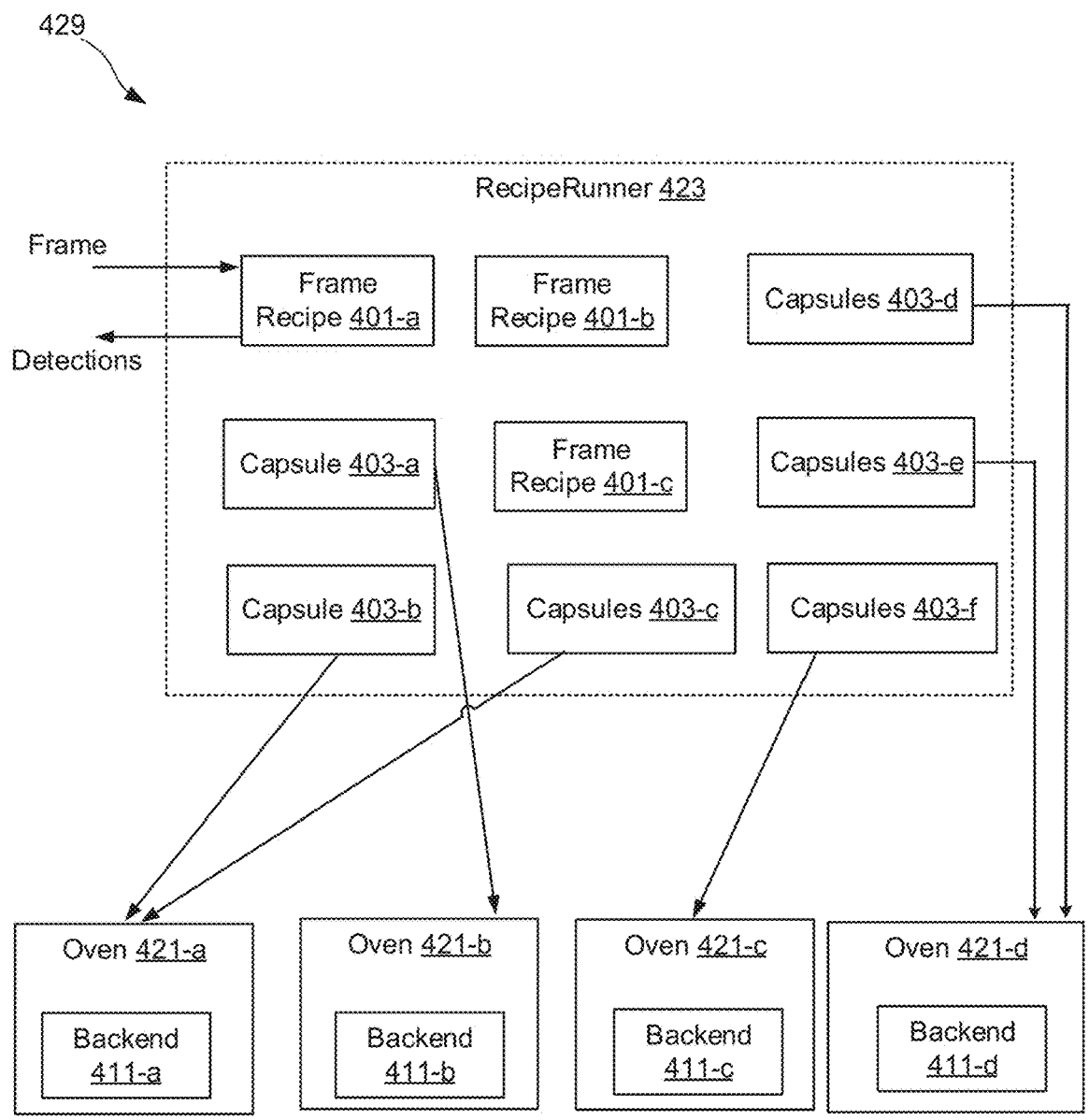
FIG. 4 illustrates an exemplary embodiment of an asynchronous, batch processing system within a digital video processing system in accordance with embodiments described herein.

FIG. 4 illustrates an exemplary embodiment of an asynchronous, batch processing system 429 within a digital video processing system (e.g., digital video processing system 300 described in FIG. 3). In some cases, the asynchronous, batch processing system 429 may implement one or more aspects of FIG. 3, or other figures described herein. In some examples, one or more frame recipes 401 (e.g., frame recipes 401-a, 401-b, 401-c) and/or digital video frames being currently analyzed or processed may be sent to RecipeRunner 423, as shown by the Frame arrow in FIG. 4. Further, RecipeRunner 423 may execute non-blocking code portions within each frame recipe 401, where each frame recipe 401 may create/load/access new (or existing) recipes from capsules 403 (e.g., capsules 403-a, 403-b, 403-c, 403-d, 403-e, 403-f) for execution at ovens 421 (e.g., oven 421-a, 420-b, 421-c). In some cases, blocking code within each frame recipe 401 may also be sent to the ovens 421 for execution. It should be noted that the RecipeRunner 423, ovens 421, capsules 403, and frame recipes 401 may be similar or substantially similar to the RecipeRunner 323, oven 321, capsules 303, and frame recipes 301 described in relation to FIG. 3.

In some embodiments, the ovens 421 may batch process frame recipes 401 utilizing a backend 411 (e.g., backend 411-a, 411-b, 411-c, or 411-d). After batch processing the frame recipes, the oven 421 may send the resulting frame analysis information, which may include object detections within the frame, back to the respective frame recipe 401 that requested the processing, via queues. In some examples, the recipes 401 may then send the frame analysis information (e.g., an object detection) out of the RecipeRunner 423, also via queues, as shown by the Detections arrow in FIG. 4. In some embodiments, the backends 411 may be spawned on a plurality of CPUs and GPUs (not shown) within the digital video processing system, which may serve to scale processing operability in accordance with the processing demands of the recipes.

In some cases, upon instantiation of a capsule 403, an underlying host machine may be scanned for devices electronically and/or communicatively coupled to the host machine. In some cases, the devices may be supported by different frameworks, such as the x86 architecture for CPUs, architecture(s) for NVIDIA GPUs, architecture for Intel's MOVIDIUS MYRIAD X Vision Processing Unit (VPU), to name a few non-limiting examples. In some cases, VPUs may be used to support visual intelligence, including computer vision and deep neural network inferencing applications. Furthers, VPUs may allow imaging, computer vision, and/or machine intelligence applications to be moved to network edge devices. In some embodiments, VPUs may comprise a dedicated on-chip accelerator, also referred to as a neural compute engine, for deep neural networks (DNN), which may serve to enhance DNN inferencing performance. This neural compute engine may allow for DNNs to be run in real time at the edge. Other examples of VPUs may also include one or more of a plurality of programmable vector processors (i.e., to run multiple concurrent imaging and vision application pipelines), a plurality of configurable mobile industry processor interface (MIPI) lanes, vision accelerators (i.e., to perform tasks such as optical flow and stereo depth, where a stereo pair comprises two camera inputs), and a homogenous on-chip memory (i.e., centralized on-chip memory architecture). It should be noted that, when the underlying host machine comprises multiple GPUs and/or VPUs, a backend may be instantiated for each device it supports.

In some circumstances, frames from a plurality of video sources may be processed in batches on the same backend 411 (e.g., backend 411-a), which may facilitate in reducing processing overhead. For example, in some embodiments, the frame recipes 401 may be utilized for analyzing one or more aspects of a single video frame. In such cases, in the processing of a frame recipe 401, capsule or plugin recipes may be created for each capsule 403 processing the digital video frame. It should be noted that, each of the capsules 403 may be loaded with a capsule or plugin recipe previously described above.

Figure 5:
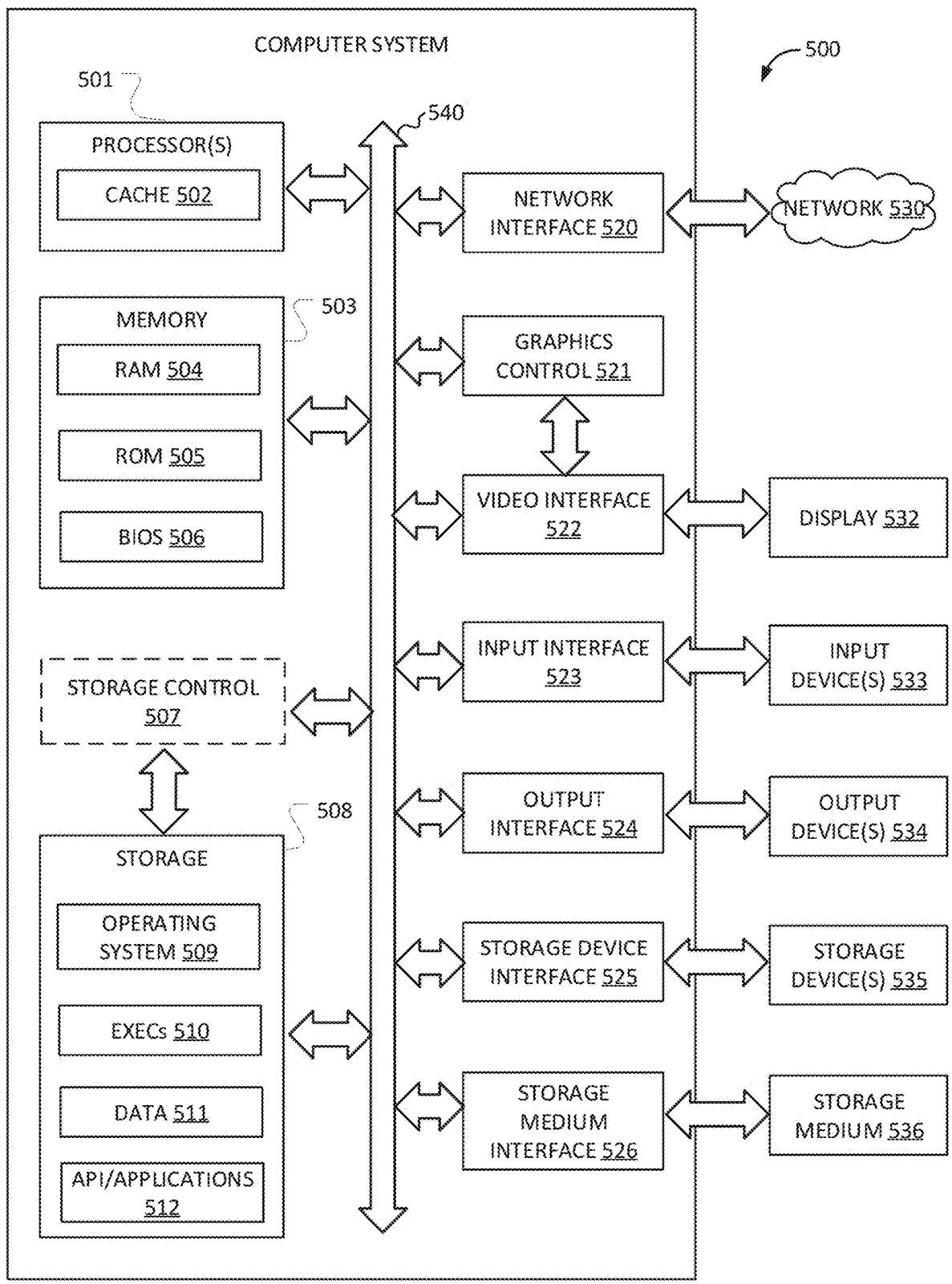
FIG. 5 illustrates a diagrammatic representation of one embodiment of a computer system within which a set of instructions can execute for causing a device to perform or execute any one or more of the aspects and/or methodologies of the present disclosure.

In addition to the specific embodiments described herein, the systems and methods described herein can be implemented in a computer system such as, but not limited to, the FIG. 5 diagrammatic representation of one embodiment of a computer system 500, within which a set of instructions can execute for causing a device to perform or execute any one or more of the aspects and/or methodologies of the present disclosure. The components in FIG. 5 are examples only and do not limit the scope of use or functionality of any hardware, software, firmware, embedded logic component, or a combination of two or more such components implementing particular embodiments of this disclosure. Some or all of the illustrated components can be part of the computer system 500. For instance, the computer system 500 can be a general-purpose computer (e.g., a laptop computer) or an embedded logic device (e.g., an FPGA), to name just two non-limiting examples.

Moreover, the components may be realized by hardware, firmware, software, or a combination thereof. Those of ordinary skill in the art in view of this disclosure will recognize that if implemented in software or firmware, the depicted functional components may be implemented with processor-executable code that is stored in a non-transitory, processor-readable medium such as non-volatile memory. In addition, those of ordinary skill in the art will recognize that hardware such as field programmable gate arrays (FPGAs) may be utilized to implement one or more of the constructs depicted herein.

Computer system 500 includes at least a processor 501 such as a central processing unit (CPU) or a graphics processing unit (GPU) to name two non-limiting examples. Any of the subsystems described throughout this disclosure could embody the processor 501. The computer system 500 may also comprise a memory 503 and a storage 508, both communicating with each other, and with other components, via a bus 540. The bus 540 may also link a display 532, one or more input devices 523 (which may, for example, include a keypad, a keyboard, a mouse, a stylus, etc.), one or more output devices 534, one or more storage devices 535, and various non-transitory, tangible computer-readable storage media 536 with each other and/or with one or more of the processor 501, the memory 503, and the storage 508. All of these elements may interface directly or via one or more interfaces or adaptors to the bus 540. For instance, the various non-transitory, tangible computer-readable storage media 536 can interface with the bus 540 via storage medium interface 526. Computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 501 (or central processing unit(s) (CPU(s))) optionally contains a cache memory unit 532 for temporary local storage of instructions, data, or computer addresses. Processor(s) 501 are configured to assist in execution of computer-readable instructions stored on at least one non-transitory, tangible computer-readable storage medium. Computer system 500 may provide functionality as a result of the processor(s) 501 executing software embodied in one or more non-transitory, tangible computer-readable storage media, such as memory 503, storage 508, storage devices 535, and/or storage medium 536 (e.g., read only memory (ROM)). Memory 503 may read the software from one or more other non-transitory, tangible computer-readable storage media (such as mass storage device(s) 535, 536) or from one or more other sources through a suitable interface, such as network interface 520. Any of the subsystems herein disclosed could include a network interface such as the network interface 520. The software may cause processor(s) 501 to carry out one or more processes or one or more steps of one or more processes described or illustrated herein. Carrying out such processes or steps may include defining data structures stored in memory 503 and modifying the data structures as directed by the software. In some embodiments, an FPGA can store instructions for carrying out functionality as described in this disclosure. In other embodiments, firmware includes instructions for carrying out functionality as described in this disclosure.

The memory 503 may include various components (e.g., non-transitory, tangible computer-readable storage media) including, but not limited to, a random-access memory component (e.g., RAM 504) (e.g., a static RAM "SRAM", a dynamic RAM "DRAM, etc.), a read-only component (e.g., ROM 505), and any combinations thereof. ROM 505 may act to communicate data and instructions unidirectionally to processor(s) 501, and RAM 504 may act to communicate data and instructions bidirectionally with processor(s) 501. ROM 505 and RAM 504 may include any suitable non-transitory, tangible computer-readable storage media. In some instances, ROM 505 and RAM 504 include non-transitory, tangible computer-readable storage media for carrying out a method. In one example, a basic input/output system 506 (BIOS), including basic routines that help to transfer information between elements within computer system 500, such as during start-up, may be stored in the memory 503.

Fixed storage 508 is connected bi-directionally to processor(s) 501, optionally through storage control unit 507. Fixed storage 508 provides additional data storage capacity and may also include any suitable non-transitory, tangible computer-readable media described herein. Storage 208 may be used to store operating system 509, EXECs 510 (executables), data 511, API applications 512 (application programs), and the like. Often, although not always, storage 508 is a secondary storage medium (such as a hard disk) that is slower than primary storage (e.g., memory 503). Storage 508 can also include an optical disk drive, a solid-state memory device (e.g., flash-based systems), or a combination of any of the above. Information in storage 508 may, in appropriate cases, be incorporated as virtual memory in memory 503.

In one example, storage device(s) 535 may be removably interfaced with computer system 500 (e.g., via an external port connector (not shown)) via a storage device interface 525. Particularly, storage device(s) 535 and an associated machine-readable medium may provide nonvolatile and/or volatile storage of machine-readable instructions, data structures, program modules, and/or other data for the computer system 500. In one example, software may reside, completely or partially, within a machine-readable medium on storage device(s) 535. In another example, software may reside, completely or partially, within processor(s) 501.

Bus 540 connects a wide variety of subsystems. Herein, reference to a bus may encompass one or more digital signal lines serving a common function, where appropriate. Bus 540 may be any of several types of bus structures including, but not limited to, a memory bus, a memory controller, a peripheral bus, a local bus, a video bus (e.g., video bus 327 previously described in relation to FIG. 3), an AI bus (e.g., AI bus 325 described in FIG. 3), an AI control bus (e.g., AI control bus 313 in FIG. 3), and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 500 may also include an input device 533. In one example, a user of computer system 500 may enter commands and/or other information into computer system 500 via input device(s) 533. Examples of an input device(s) 533 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 533 may be interfaced to bus 540 via any of a variety of input interfaces 523 (e.g., input interface 523) including, but not limited to, serial, parallel, game port, USB, FIREWIRE, THUNDERBOLT, or any combination of the above.

In particular embodiments, when computer system 500 is connected to network 530, computer system 500 may communicate with other devices, such as mobile devices and enterprise systems, connected to network 530. Communications to and from computer system 500 may be sent through network interface 520. For example, network interface 520 may receive incoming communications (such as requests or responses from other devices) in the form of one or more packets (such as Internet Protocol (IP) packets) from network 530, and computer system 500 may store the incoming communications in memory 503 for processing. Computer system 500 may similarly store outgoing communications (such as requests or responses to other devices) in the form of one or more packets in memory 503 and communicated to network 530 from network interface 520. Processor(s) 501 may access these communication packets stored in memory 503 for processing.

Examples of the network interface 520 include, but are not limited to, a network interface card, a modem, and any combination thereof. Examples of a network 530 or network segment 530 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 530, may employ a wired and/or a wireless mode (e.g., Wi-Fi, Bluetooth, Near Field Communication (NFC), Cellular, including 3G, 4G, 5G) of communication. In general, any network topology may be used.

Information and data can be displayed through a display 532. Examples of a display 532 include, but are not limited to, a liquid crystal display (LCD), an organic liquid crystal display (OLED), a cathode ray tube (CRT), a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521.

In addition to a display 532, computer system 500 may include one or more other peripheral output devices 534 including, but not limited to, an audio speaker, a printer, and any combinations thereof. Such peripheral output devices may be connected to the bus 540 via an output interface 524. Examples of an output interface 524 include, but are not limited to, a serial port, a parallel connection, a USB port, a FIREWIRE port, a THUNDERBOLT port, and any combinations thereof.

In addition, or as an alternative, computer system 500 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

It is contemplated that one or more of the components or subcomponents described in relation to the computer system 500 shown in FIG. 5 such as, but not limited to, the network 530, processor 501, memory, 503, etc., may comprise a cloud computing system. In one such system, front-end systems such as input devices 533 may provide information to back-end platforms such as servers (e.g. computer systems 500) and storage (e.g., memory 503). Software (i.e., middleware) may enable interaction between the front-end and back-end systems, with the back-end system providing services and online network storage to multiple front-end clients. For example, a software-as-a-service (SAAS) model may implement such a cloud-computing system. In such a system, users may operate software located on back-end servers through the use of a front-end software application such as, but not limited to, a web browser.

FIG. 6 illustrates a table of an exemplary list of capsules 603 that may be used in a digital video processing system, such as the digital video processing system 300 in FIG. 3. It should be noted that, for the purposes of this disclosure, the term "capsules" may also be referred to as "plugins". In some embodiments, a capsule or plugin may output information about a single detected object in a detection container. In some embodiments, a detection container may include a polygon shape, a name (e.g., a person, car, chair), and/or various other attributes. It should be noted that a zone (e.g., zone 735 in FIG. 7) may refer to an area where detections reside. For instance, a zone may be used to mark a table at a restaurant, an entryway, a "no people allowed here" area, etc., to name a few non-limiting examples. Furthermore, a detection container may refer to a digital 'box' around an object matching a certain set of attributes, whereas a zone, such as zone 735 in FIG. 7, may be a physical area where detections are to be performed, or alternatively, where detections reside. It should be noted that, a detection container may encompass a subset of the physical area defined by the zone. Further, a detection container (e.g., a 'box') may be marked around an object (e.g., a person, piece of furniture) residing in the zone. In some cases, multiple objects within a zone may each be associated with a respective detection container. Further, different attributes, shapes (e.g., polygon shape) or names (e.g., person, car, chair, etc.) may be used to characterize the objects in the different detection containers. Thus, a zone may comprise multiple detection containers based on the number of objects within the zone or detection area.

In some examples, object output information may comprise polygon, encoding, tracking identifier (ID), and/or attribute information, to name a few non-exhaustive examples. In some cases, polygon information may comprise a list of coordinates on a digital video or image, where the coordinates may be used to represent an object comprising an enclosed shape, as well as a location of the object.

The exemplary "Detector Person/Vehicles" and "Detector Face" capsules of FIG. 6 may be deployed to generate such polygon information. In some examples, encoding information may comprise a vector of values, such as floating-point values, that can be used to define the identity of an object, such as of a person or a face. Furthermore, the encoding information of two or more objects may be compared to determine their similarity using, for example, a Euclidian distance or cosine similarity between the two or more encoding information vectors. As an example, the similarity of encoding vectors related to a person's face or gait (e.g., walking style), may be used to determine the identity of a person detected in a digital video or image. The exemplary "Encoder Face" and "Encoder Person" capsules or plugins of FIG. 6 may generate such encoding information, for instance, after receiving polygon information indicating the location of the face or person for whom the encoding information has to be generated.

In some examples, tracking ID information may comprise a unique identifier for a real-world object. Further, the identifier may be used for tracking an object across multiple digital video frames. In some cases, the exemplary "Tracker Person" capsule or plugin of FIG. 6 may generate such tracking ID information. The "Tracker Person" capsule may use polygon information associated with the location of a person and/or encoding information relating to the person. In some cases, attribute information may comprise additional information for a selected object, such as the information received from the "Classifier Gender" capsule (or plugin) of FIG. 6. In some examples, the "Classifier Gender"

capsule may be configured to determine the gender (e.g., Male, Female) of a face based on its polygon information.

In some embodiments, groups of capsules or plugins (e.g., shown as capsules 303 or 403 in relation to FIGS. 3 and 4) may be configured to process digital video or image inputs in a certain sequence, in parallel, or in a combination of both. For example, the "Detector Face" and "Encoder Face" Plugins of FIG. 6 may be grouped to process digital video or image inputs in sequence, and subsequently generate both encoding information and polygon location information related to detected faces in the digital video stream or image(s). Additionally, in some examples, the resulting encoding and polygon information may be sent from the "Detector Face" and Encoder Face" capsules to another group of capsules (e.g., "Tracker Person" and "Classifier Gender" capsules) for further processing. In some aspects, grouping of capsules or plugins, as well as capsule outputs may serve to minimize communication overhead.

Figure 7:
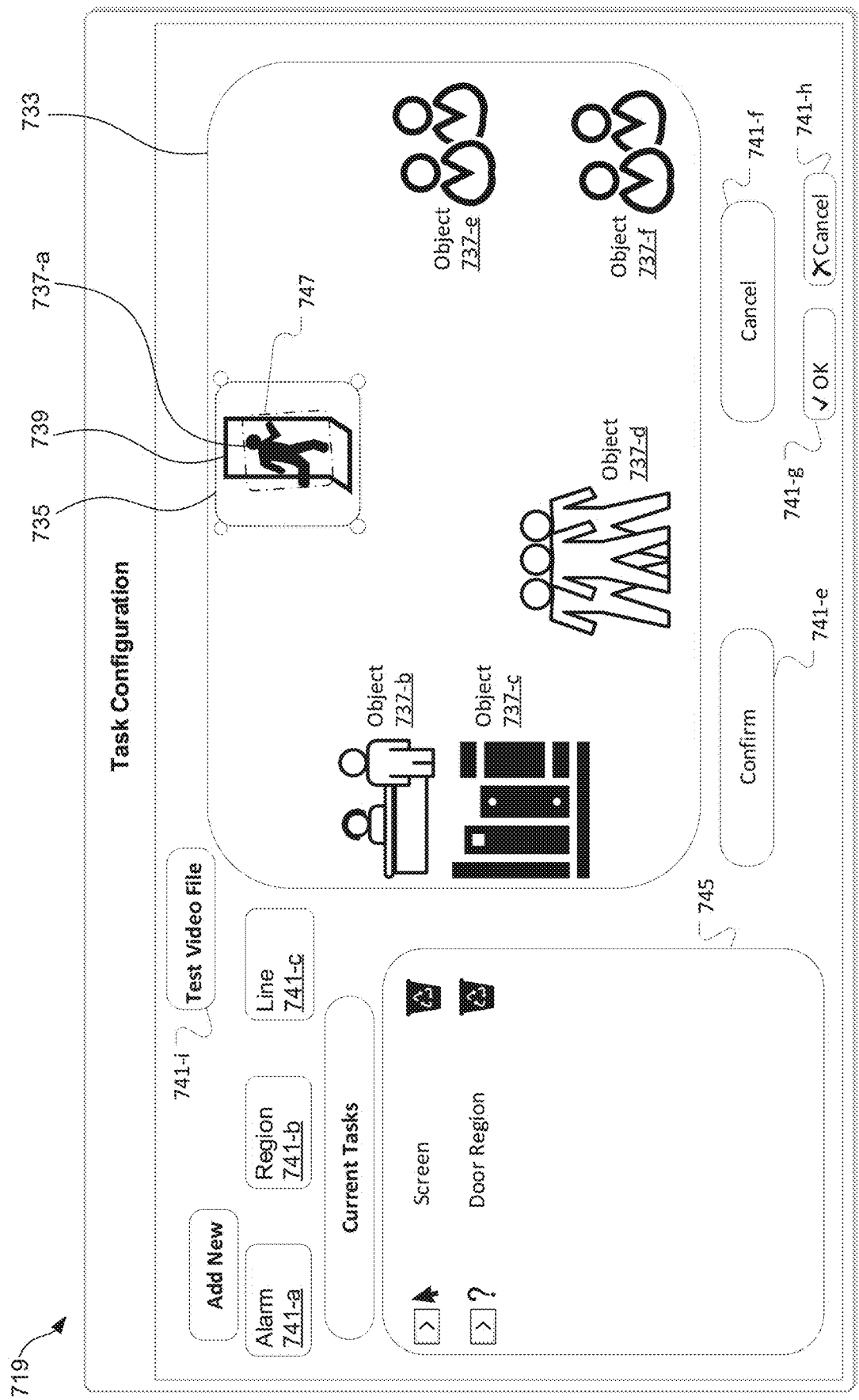
FIG. 7 illustrates a user interface depicting an exemplary zone definition within a video by a digital video processing system in accordance with embodiments described herein.

FIG. 7 illustrates a user interface 719 of a digital video processing system (e.g., shown as digital video processing system 300 in FIG. 3), where the user interface 719 depicts an exemplary zone definition within a video 733. In some cases, FIG. 7 may implement one or more aspects of the figures described herein. In some embodiments, the digital video processing system may enable a user (not shown) to define the zone 735 (also referred to as region in some cases) within the video 733, where the zone 735 may be used during the analysis of the digital video. In some cases, the video 733 may comprise one or more digital video frames, where each digital video frame includes one or more objects 737 (e.g., objects 737-a, 737-b, 737-c, 737-d, 737-e, and/or 737-f). In some cases, the objects 737 may include inanimate objects, such as furniture, books, vending machines, etc., animate objects, such as people or animals, or a combination.

As illustrated, in some cases, a user may define the zone 735 (or region) around a door 739 and direct the video processing system to count the number of detected objects, such as object 737-a, that are within or passing through the zone 735. In some cases, the object 737-a may be a person or animal passing through the door 739. In some embodiments, alerts or alarms (e.g., visual, auditory, etc.) may be sent to a user based on the detection or prediction information of objects in the zone 735. For example, if a large number of objects 737 are detected within the zone 735 (or region), an alert may be sent to a user to indicate that a large number of people are entering or exiting the building through the door 739 contained in the zone 735.

As illustrated, the user interface 719 may mark and display a detection container 747 around an object, such as object 737-a within the zone 735. In some embodiments, the detection container 747 may include a polygon shape, a name (e.g., a person, car, chair), and/or various other attributes. It should be noted that the zone 735 may refer to an area where detections reside. For instance, a zone (e.g., zone 735) may be used to mark a table at a restaurant, an entryway, a door 739, a "no people allowed here" area, etc., to name a few non-limiting examples. Furthermore, the detection container 747 may refer to a digital 'box' around an object matching a certain set of attributes (e.g., object 737-a is walking through the door 739) within the zone 735, while the zone 735 may be a physical area where detections are to be performed, or alternatively, where detections reside. It should be noted that, detection container 747 may encompass a subset of the physical area defined by the zone 745. Further, detection container 747 may be marked around an object (e.g., a person, piece of furniture) residing in the zone 735. In some cases, multiple objects within zone 735 may each be associated with a respective detection container (not shown). For instance, user interface 719 may be configured to label another detection container, different from the detection container 747, around the door 739. The detection container around the door 739, not shown, may overlap or coincide with some portions of the detection container 737. Further, different attributes, shapes (e.g., polygon shape) or names (e.g., person, car, chair, etc.) may be used to characterize the objects in the different detection containers. Thus, the zone 735 may comprise multiple detection containers, including detection container 747, where the number of detection containers may be based in part on the number of objects within the zone or detection area.

Furthermore, as seen, the user interface 719 may be an example of an interactive user interface presented via a visual display (e.g., on a laptop, or smart phone). Further, the user interface 719 may comprise one or more buttons (e.g., buttons 741-a, 741-b, 741-c, 741-d, 741-e, 741-f, 741-g, and 741-h) for receiving input (e.g., via a mouse) from the user. In some embodiments, the user interface 719 may allow a user to add a new alarm, region, and/or line via buttons 741-a, 741-b, and 741-c, respectively, of the interactive user interface. Additionally or alternatively, the user interface may also display a list of current tasks 745 (e.g., Screen, Door region) set by the user, or allow the user to test a video file via button 741-i. The user may add or delete tasks from the list of current tasks 745 via the interactive user interface 719. After selecting the tasks and/or adding new alarms, regions, lines, etc., the user may confirm their selection using button 741-e. In other cases, the user may cancel any accidental modifications using button 741-f.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for processing digital video, the system comprising:
one or more hardware processors configured by machine-readable instructions to:
receive digital video data at one or more digital video inputs, wherein the digital video data comprises a plurality of video frames;
identify each of the plurality of video frames as one of a keyframe and an intermediate frame;
use one or more first sets of software instructions to send at least one of the keyframes and the intermediate frames to one or more processing scripts;
use the one or more processing scripts to implement an asynchronous batch processing system on at least one of the keyframes and the intermediate frames by applying one or more second sets of software instructions; and
receive an output from the one or more second sets of software instructions.

2. The system of claim 1, wherein the digital video data comprises data received from at least one of digital video cameras, video files, and video streams;
   wherein the at least one of the keyframes and the intermediate frames comprise the keyframes, wherein the keyframes are sent to the one or more processing scripts via a software data transfer component;
   wherein each of the one or more second sets of software instructions comprise linear lists of software instructions, and wherein the linear lists of software instructions analyze one or more aspects of each of the keyframes;
   wherein each of the one or more processing scripts comprises an oven;
   wherein implementing an asynchronous batch processing system by applying one or more second sets of software instructions comprises executing multiple sets of the linear lists of software instructions in-parallel via a plurality of ovens; and
   wherein the output from the one or more second sets of software instructions is received via the software data transfer component.

3. The system of claim 2, wherein each of the linear lists of software instructions comprises a capsule, and wherein at least one of the capsules comprises a machine learning inference;
   wherein multiple machine learning inferences are executed in batches on one or more of the plurality of ovens;
   wherein the multiple machine learning inferences comprise inferences received from multiple capsules; and
   wherein the software data transfer component comprises a video bus.

4. The system of claim 3, wherein at least one of the multiple machine learning inferences comprises a neural network inference;
   wherein the one or more hardware processors are further configured by machine-readable instructions to initialize a machine learning system onto one or more hardware components of a digital video processing system, wherein the machine learning system comprises a neural network;
   wherein the one or more hardware processors are further configured by machine-readable instructions to execute the machine learning inference;
   wherein the neural network comprises a neural network for at least one of object recognition, object tracking, a bounding box identifying a location of an object, a person's age, a person's gender, and object trajectory; and
   wherein the output is at least partially based on information received from the neural network.

5. The system of claim 4, wherein the oven comprises a backend;
   wherein initializing a machine learning system onto one or more hardware components of a digital video processing system comprises spawning a plurality of backends on a plurality of central processing units and graphical processing units;
   wherein one or more of the capsules are processed sequentially; and
   wherein the output from at least one of the one or more capsules is utilized by least another one of the one or more capsules.

6. The system of claim 1, wherein the one or more hardware processors are further configured by machine-readable instructions to:
   utilize one or more third sets of software instructions to process any non-blocking portions within the one or more first sets of software instructions;
   utilize an interface to adjust the output;
   wherein each of the one or more first sets of software instructions comprises a recipe;
   wherein at least a portion of the output is adjusted based on a confidence level; and
   wherein the output is provided to at least one of the recipes.

7. The system of claim 6 wherein each of the one or more third sets of software instructions comprises a RecipeRunner; wherein the non-blocking portions of the one or more first sets of software instructions comprise portions where the processing will not stall an execution of the recipes.

8. A method of processing digital video, the method comprising:
   receiving digital video data at one or more digital video inputs, wherein the digital video data comprises a plurality of video frames;
   identifying each of the plurality of video frames as one of a keyframe and an intermediate frame;
   using one or more first sets of software instructions to send at least one of the keyframes and the intermediate frames to one or more processing scripts;
   using the one or more processing scripts to implement an asynchronous batch processing system on at least one of the keyframes and the intermediate frames by applying one or more second sets of software instructions; and
   receiving an output from the one or more second sets of software instructions.

9. The method of claim 8, wherein the digital video data comprises data received from at least one of digital video cameras, video files, and video streams;
   wherein the at least one of the keyframes and the intermediate frames comprise the keyframes, and wherein the keyframes are sent to the one or more processing scripts via a software data transfer component;
   wherein each of the one or more second sets of software instructions comprise linear lists of software instructions which analyze one or more aspects of each of the keyframes;
   wherein each of the one or more processing scripts comprises an oven;
   wherein implementing an asynchronous batch processing system by applying one or more second sets of software instructions comprises executing multiple sets of the linear lists of software instructions in-parallel via a plurality of ovens; and
   wherein the output from the one or more second sets of software instructions is received via the software data transfer component.

10. The method of claim 9, wherein each of the linear lists of software instructions comprises a capsule and at least one of the capsules comprises a machine learning inference;
    wherein multiple machine learning inferences are executed in batches on one or more of the plurality of ovens;
    wherein the multiple machine learning inferences comprise inferences received from multiple capsules; and
    wherein the software data transfer component comprises a video bus.

11. The method of claim 10, wherein at least one of the multiple machine learning inferences comprises a neural network inference, the method further comprising:

initializing a machine learning system onto one or more hardware components of a digital video processing system, wherein the machine learning system comprises a neural network;

executing the machine learning inference;

wherein the neural network comprises a neural network for at least one of object recognition, object tracking, a bounding box identifying a location of an object, a person's age, a person's gender, and object trajectory; and wherein the output is at least partially based on information received from the neural network.

12. The method of claim 11, wherein the oven comprises a backend;

wherein initializing a machine learning system onto one or more hardware components of a digital video processing system comprises spawning a plurality of backends on a plurality of central processing units and graphical processing units;

wherein one or more of the capsules are processed sequentially; and wherein the output from at least one of the one or more capsules is utilized by least another one of the one or more capsules.

13. The method of claim 8, further comprising:

utilizing one or more third sets of software instructions to process any non-blocking portions within the one or more first sets of software instructions;

utilizing an interface to adjust the output;

wherein each of the one or more first sets of software instructions comprises a recipe;

wherein at least a portion of the output is adjusted based on a confidence level; and wherein the output is provided to at least one of the recipes.

14. The method of claim 13 wherein each of the one or more third sets of software instructions comprises a RecipeRunner; wherein the non-blocking portions of the one or more first sets of software instructions comprise portions where the processing will not stall an execution of the recipes.

15. A non-transient computer-readable storage medium having instructions embodied thereon, the instructions being executable by one or more processors to perform a method for processing digital video, the method comprising:

receiving digital video data at one or more digital video inputs, wherein the digital video data comprises a plurality of video frames;

identifying each of the plurality of video frames as one of a keyframe and an intermediate frame;

using one or more first sets of software instructions to send at least one of the keyframes and the intermediate frames to one or more processing scripts;

using the one or more processing scripts to implement an asynchronous batch processing system on at least one of the keyframes and the intermediate frames by applying one or more second sets of software instructions; and receiving an output from the one or more second sets of software instructions.

16. The computer-readable storage medium of claim 15, wherein the digital video data comprises data received from at least one of digital video cameras, video files, and video streams;

wherein the at least one of the keyframes and the intermediate frames comprise the keyframes, and wherein the keyframes are sent to the one or more processing scripts via a software data transfer component;

wherein each of the one or more second sets of software instructions comprise linear lists of software instructions which analyze one or more aspects of each of the keyframes;

wherein each of the one or more processing scripts comprises an oven;

wherein implementing an asynchronous batch processing system by applying one or more second sets of software instructions comprises executing multiple sets of the linear lists of software instructions in-parallel via a plurality of ovens; and wherein the output from the one or more second sets of software instructions is received via the software data transfer component.

17. The computer-readable storage medium of claim 16, wherein each of the linear lists of software instructions comprises a capsule and at least one of the capsules comprises a machine learning inference;

wherein multiple machine learning inferences are executed in batches on one or more of the plurality of ovens;

wherein the multiple machine learning inferences comprise inferences received from multiple capsules; and wherein the software data transfer component comprises a video bus.

18. The computer-readable storage medium of claim 17, wherein at least one of the multiple machine learning inferences comprises a neural network inference;

wherein the method further comprises initializing a machine learning system onto one or more hardware components of a digital video processing system, wherein the machine learning system comprises a neural network;

executing the machine learning inference;

wherein the neural network comprises a neural network for at least one of object recognition, object tracking, a bounding box identifying a location of an object, a person's age, a person's gender, and object trajectory; and wherein the output is at least partially based on information received from the neural network.

19. The computer-readable storage medium of claim 18, wherein the oven comprises a backend;

wherein initializing a machine learning system onto one or more hardware components of a digital video processing system comprises spawning a plurality of backends on a plurality of central processing units and graphical processing units;

wherein one or more of the capsules are processed sequentially; and wherein the output from at least one of the one or more capsules is utilized by least another one of the one or more capsules.

20. The computer-readable storage medium of claim 15, wherein the method further comprises:

utilizing one or more third sets of software instructions to process any non-blocking portions within the one or more first sets of software instructions;

utilizing an interface to adjust the output;

wherein each of the one or more first sets of software instructions comprises a recipe;

wherein at least a portion of the output is adjusted based on a confidence level; and wherein the output is provided to at least one of the recipes.

\* \* \* \* \*